United States Patent [19]

Guth et al.

[11] Patent Number: 4,689,733
[45] Date of Patent: Aug. 25, 1987

[54] METHOD FOR REDUCING DYNAMIC OVERVOLTAGES IN AN ALTERNATING-CURRENT SYSTEM TO WHICH A DIRECT-CURRENT SYSTEM IS CONNECTED

[75] Inventors: Gerhard Guth, Nussbaumen; Walter Kuhn, Rutihof; Gerhard Linhofer, Baden, all of Switzerland; Kadry Sadek, Lauchringen, Fed. Rep. of Germany

[73] Assignee: BBC Brown, Boveri & Company, Limited, Baden, Switzerland

[21] Appl. No.: 878,322

[22] Filed: Jun. 25, 1986

Related U.S. Application Data

[63] Continuation-in-part of Ser. No. 742,007, Jun. 6, 1985, abandoned.

[30] Foreign Application Priority Data

Jul. 4, 1984 [CH] Switzerland ............................ 3217/84

[51] Int. Cl.$^4$ .............................................. H02H 7/00
[52] U.S. Cl. ......................................... 363/51; 363/35
[58] Field of Search ................. 363/35, 37, 51, 78–79, 363/85–87, 96; 361/56, 91

[56] References Cited

U.S. PATENT DOCUMENTS 3,628,124 12/1971 Johansson ............................. 363/51
3,662,250 5/1972 Piccone et al. ....................... 363/51
3,968,419 7/1976 Ekstrom ........................... 363/51 X Primary Examiner—Peter S. Wong
Attorney, Agent, or Firm—Burns, Doane, Swecker & Mathis

[57] ABSTRACT

Where different 3-phase systems are connected to each other via two static converters having an intermediate direct-current circuit, the exchange of power via the intermediate direct-current circuit can be interrupted by a severe disturbance, for example by failure of a static-converter or by line or busbar faults causing a short-circuiting of one of the static converters. This interruption means a change in the balance of effective power and, associated with this, a shedding of reactive load for the other undisturbed 3-phase system. To reduce high dynamic overvoltages which can lead to plant components being endangered or to operational disturbances, the firing angle of the static converter remaining in operation is regulated with dependence on the alternating voltage of the alternating-current system connected to this static converter, in such a manner that the overvoltage is reduced. This is carried out by regulating the current. The firing angle can be adjusted simultaneously with the short circuiting of the intermediate direct-current circuit by means of a short circuit device.

10 Claims, 2 Drawing Figures ical equations, v# METHOD FOR REDUCING DYNAMIC OVERVOLTAGES IN AN ALTERNATING-CURRENT SYSTEM TO WHICH A DIRECT-CURRENT SYSTEM IS CONNECTED This is a continuation-in part of Ser. No. 742,007, filed June 6, 1985, now abandoned.

BACKGROUND OF THE INVENTION

The invention relates to methods for reducing dynamic overvoltages in an alternating-current system.

One method of the prior art for reducing dynamic overvoltages in an alternating-current system is described in U.S. Pat. No. 3,968,419. In that document, a method for the transition from a bipolar to a monopolar mode of operation of a converter having an intermediate direct-current circuit having two metallic direct-current lines and two each series-connected static converters in the rectifier and inverter stations is described. According to that method, each of the two seriesconnected static converters is connected via one choke each to a grounding switch. Each static converter can also be short-circuited via its associated choke. There is no voltage regulation on the 3-phase side. When a static converter is short-circuited, spurious reactive-load oscillations are generated.

Regarding the relevant prior art, additional reference is made to printed publication IEE Proc., Vol. 127, Pt.C. No. 3, 1980, pp. 189-198, in which methods for reducing overvoltages which can occur when a 12-pulse high-voltage rectifier is blocked are specified. A static-converter transformer can be used, the magnetic core of which is rapidly driven into saturation with increasing current intensity, in which arrangement the magnetization characteristic of this core has a curve with a steep slope at low currents and with a shallow curve at high currents. Filters, particularly for the fifth harmonic of the fundamental frequency, and static capacitors are considered as second choices. A disadvantage of the methods specified above consists in the fact that the additional equipment required is elaborate and expensive.

Other protective devices for power converter installations are known, for example, from: GEC Journal of Science and Technology, Vol. 48, No. 3, 1982, pp. 135-140 and from Conference Paper No. 70 CP 140-PWR, IEEE Power System Engineering Committee of the IEEE Power Group, New York, N.Y., Jan. 25-30, 1970, pp. 1-8."

The system-commutated static converters of a high voltage direct-current transmission plant act as consumers of reactive power in the system. The magnitude of the reactivepower absorption is a function of the magnitude of the commutation reactances which mainly consist of the leakage reactances of the static-converter transformer, the firing angle and the amplitude of the instantaneous operating current. A part of the reactive power is supplied by the filters installed for reducing harmonics, that is to say by absorption circuits which have a capacitive characteristic with respect to the fundamental frequency. The remainder of the reactive power required is obtained either from the 3-phase system or from additional compensating devices, in most cases from capacitor banks.

If then a serious disturbance occurs in one of the two systems connected by the high-voltage direct-current transmission plant and forces a temporary interruption of the exchange of power via the high-voltage direct-current transmission plant, this means not only a change in the balance of effective power for the other, undisturbed system but also always an associated shedding of reactive load. Particularly if the connecting point of the high-voltage direct-current transmission plant to the undisturbed system without faults is a system node having a low short-circuit power (for example the end of a long 3-phase line), high dynamic overvoltages occur at this system node which can lead to plant components being endangered or to operational disturbances.

OBJECTS AND SUMMARY OF THE INVENTION

The invention has as an object the reduction of dynamic overvoltages in an alternating-current system which is effectively connected to a static converter group having an intermediate direct-current circuit by regulating the firing angle of the static converter remaining in operation when another static converter has been short-circuited.

In accordance with the principles of the present invention, the firing angle of the converter remaining in operation is regulated in response to the AC voltage of the AC power system connected to it. The firing angle is adjusted in such a way as to reduce any overvoltage that might appear in that AC system as a result of a sudden interruption of the AC system-to-AC system power transmission.

An advantage of the invention consists in the fact that dynamic overvoltages caused by a sudden interruption of the transmission operation of, for example, a high-voltage direct-current transmission plant can be reduced within a short time. The cause of the sudden interruption can be, for example:
  failure of a group of static converters;
  line or busbar faults in one of the two systems connected by the high-voltage direct-current transmission plant; and/or
  line faults on the direct-current line of a long-distance high-voltage direct-current transmission plant.

Another advantage of the invention lies in the fact that the method can be used with existing plants. The existing static converters are used for regulating the reactive power. No elaborate and expensive additional equipment is required.

BRIEF DESCRIPTION OF THE DRAWINGS

The foregoing objects and advantages of the present invention will become apparent to one skilled in the art to which the invention pertains from the following detailed description read in conjunction with the drawings in which.

DETAILED DESCRIPTION

Figure 1:
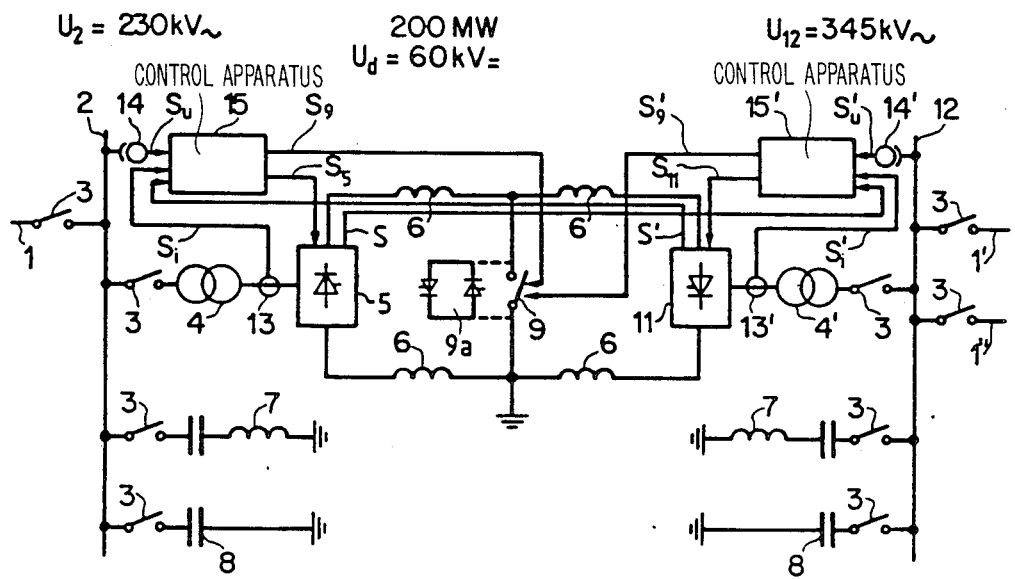
FIG. 1 shows a basic circuit diagram of a coupling of two three-phase systems by means of a converter for a high-voltage direct current (HVDC) short-distance coupling.

Referring to FIG. 1, the symbols 1, 1' and 1" indicate three-phase lines which may be connected by means of switches or circuit breaker panels 3 with three-phase busbars 2 and 12, respectively. The busbar 2 carries for example a three-phase AC current of 50 Hz with an AC voltage $U_2$ of 230 kV and the busbar 12 a three-phase AC current of 50 Hz with an AC voltage $U_{12}$ of 345 kV.

The two three-phase busbars 2 and 12 are connected through a converter with static converter groups 5 and 11, in the DC intermediate circuit of which two smoothing chokes 6 each, are inserted. For the case in which electric power is to be transmitted from the three-phase busbar 2 to the three-phase busbar 12, the static converter group 5 is operated as a rectifier and the converter group 11 as an inverter, while for a flow of power in the opposite direction, the converter group 5 acts as the inverter and the converter group 11 as the rectifier. The electric power transmitted in the DC intermediate circuit of a HVDC coupling amounts for example to 200 MW and the intermediate circuit DC voltage $U_d$ is for example 60 kV.

The converter groups 5 and 11 are connected with the three-phase busbars 2 and 12 through the converter transformers 4 and 4' and circuit breakers 3.

The converter groups 5 and 11 are each grounded on one side through smoothing or intermediate circuit chokes 6.

The grounding point is connected by means of a shorting circuit or shorting device 9 to the busbar with the higher voltage, with the connecting point being located between two smoothing chokes 6 connected in series in the DC transmission line. The shorting device 9 is preferably a mechanical switch, although an AC switch 9a comprising thyristors connected in antiparallel could also be used as the shorting device, but at higher cost.

The converter groups 5 and 11 are controlled by a control apparatus 15 and 15' respectively, described in detail in connection with FIG. 2, by means of actuating signals $S_5$ and $S_{11}$, respectively. The shorting device 9 or the thyristor circuit 9a also receives actuating/disconnecting signals $S_9$ and $S'_9$ from the two control apparatuses 15 and 15', respectively. The devices 15 and 15' continuously receive on their input sides voltage signals $S_u$ and $S'_u$, respectively, through voltage meters 14 and 14', respectively from the three-phase busbars 2 and 12, respectively and further continuously receive power signals $S_i$ and $S'_i$ through ammeters 13 and 13', respectively, arranged in the power lines from the converter transformers 4 and 4', respectively, to the converter groups 5 and 11. Each device 15 or 15' also receives a protection actuating signal S' or S, respectively, if required, from the other converter group 11 or 5, if a protective device, not shown but known in itself in the prior art, in the converter group involved responds to the occurrence of a defect and produces the protection actuating signal S' or S.

A protection actuating signal S' or S is produced if: more than 5% of the thyristors connected in series within the bridge circuit of a power converter group fail or become permanently conductive;
the auxiliary power supply for the control electronics fails;
the temperature of the cooling water for the thyristors exceeds 70° C.;
the cooling water circulation fails; or
the cooling water lines are leaking.

If, as the result of a line disturbance or a failure in a static converter, one of the two converter groups, for example the group 5, can no longer be controlled, the closing of the shorting device 9 or 9a makes it possible for the other converter group 11 to remain in operation and to absorb the idle power. The idle power compensation in the converter group 11 is effected by controlling the flow of current through this converter group, wherein however, a predeterminable upper power limit may not be exceeded. In order to prevent the occurrence of excess currents, which are reduced later only by the actuation of the power controls, it is appropriate to adjust the firing angle to about 90° prior to, or simultaneously with, the actuating command for the shorting device 9 or 9a by a direct control intervention in the regulation of the converter group 11 which, in this example, continues to operate. This mode of shorting operations corresponds to the operating mode of a static compensator.

A line disturbance is detected when the voltage signal $S_u$ exceeds a predetermined voltage limit. A disturbance in a static converter group 5 or 11 is communicated to the control device 15' or 15 by the appearance of the protection actuating signal S or S'.

To reduce harmonic oscillations in the three-phase systems and to compensate for the idle power, capacitor batteries 8 and filter circuits 7 each comprising a choke in series with a capacitor and connectable through circuit breakers 3 with the busbars 2 and 12, are provided.

Figure 2:
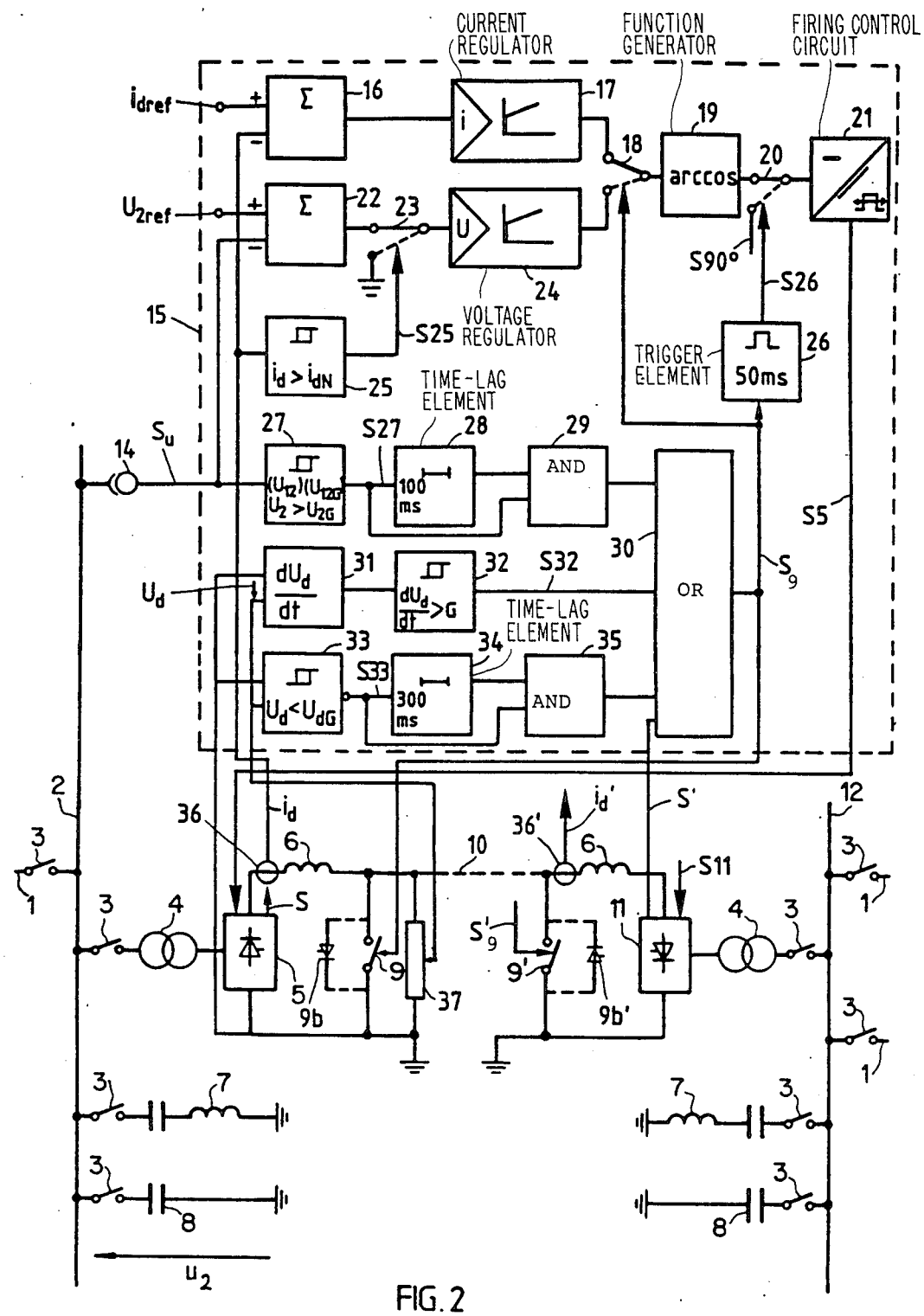
FIG. 2 shows a basic circuit diagram similar to FIG. 1 for HVDC long distance transmission.

An example of an embodiment of a HVDC long distance transmission is shown in FIG. 2 and comprises, in contrast to the example shown in FIG. 1, two shorting devices 9 and 9' that are associated with a converter station each, with the stations being connected with each other by a DC transmission line 10. In place of mechanical switches 9 and 9', thyristor switches 9b and 9b', with one thyristor only polarized in the direction of the current, may be provided.

As shown in FIG. 2, the negative poles of the two converter stations are connected not by a metal conductor, as in the embodiment of FIG. 1, but through the ground. Two smoothing chokes 6 are provided in series with the positive DC line 10. The control apparatus 15 is explained in detail below; its configuration is similar to that of the control apparatus 15', which for the sake of clarity is not shown in FIG. 2. For simplicity in the description below, physical values and signals derived from them are designated identically.

The control apparatus 15 comprises on the input side a first summing element 16, the positive input of which receives from a superior control, not shown, or from an operator a DC reference value signal i$_{dref}$, and the negative input of which receives an actual value signal i$_d$ supplied by a current transformer 36 in the DC intermediate circuit. On its output side, the summing element 16 is connected with an arc cosine function generator 19 through a current regulator 17 with a proportional-integral (P-I) characteristic and through a first input of a switch 18. The function generator 19 is connected on its output side, through the first input of a further switch 20, with the input of a firing control circuit 21, which on its output side produces the control signal $S_5$ that adjusts the angle of the firing pulses in the static converter group 5 in accordance with the input signal.

The control apparatus 15 further comprises a second summing element 22, the positive input of which receives by means of a potentiometer, not shown, a predetermined AC reference signal U$_{2ref}$ corresponding to 230 kV, and the negative input of which receives the voltage signal $S_u$ which is proportional to the actual value of the AC voltage U$_2$ of the three-phase busbar 2. On its output side the second summing element 22 is connected, through the first input of a switch 23 and a voltage regulator 24 having a P-I characteristic with the second input of the switch 18. The second input of the switch 23 is connected with ground or zero potential.

A DC comparator 25, connected on its input side with the output of current transformer 36, supplies on its output side a control signal $S_{25}$. The control signal $S_{25}$ is a "1" if the actual DC value signal $i_d$ exceeds a predetermined maximum permissible nominal current $i_{dN}$ for the DC intermediate circuit. Otherwise $S_{25}$ is "0". The control signal controls the switch 23; when $S_{25}$ is "1", the switch 23 is set in the position indicated by the broken line, while for $S_{25}=$"0" the switch 23 is set in the position shown by the solid line; in case of excessive power in the DC intermediate circuit the voltage regulator 24 receives a zero potential on its input side.

An AC comparator 27 connected on its input side with the output of the voltage meter 14 supplies on its output side a signal $S_{27}$ that is a "1" if the AC voltage $U_2$ is larger than a predetermined AC limiting value $U_{2G}$ within the range of 120% to 140% of its nominal voltage. Preferably, $U_{2G}$ is equal to 130% of the nominal voltage of $U_2$. For $U_2$ less than $U_{2G}$, $S_{27}=$"0". The signal $S_{27}$ is connected, on the one hand, through a time-lag element 28 having a predetermined time-lag of 100 milliseconds to a first input of an AND gate 29 and, on the other hand, directly with a second input of this AND gate 29. The output of the AND gate 29 is connected with a first input of an OR gate 30, from the output side of which an actuating/disconnecting signal $S_9$ is obtained. The output signal of the AND gate 29 is "1" only if for at least 100 milliseconds $U_2$ is greater than $U_{2G}$. $S_9=$"1" actuates the switch 18 into the position shown in FIG. 2 by a broken line and the shorting device 9 into the closed position (not shown in the figure). $S_9=$"0" sets the switch 18 in the position shown by the solid line and the shorting device 9 in the open position shown. The actuating/disconnecting signal $S_9$ is also passed to a monostable trigger element 26 which, on the leading edge of the signal $S_9=$"1", produces an output signal $S_{26}=$"1" of a 50 millisecond duration. $S_{26}=$"1" in turn sets the switch 20 in the position shown in FIG. 2 by the broken line. $S_{26}=0$ sets the switch 20 in the position indicated by the solid line, by which the output signal of the arc cosine function generator 19 is conducted to the firing control circuit 21. When $S_{26}=$"1" the firing control circuit 21 receives the 90° control signal S90°, the DC voltage value of which corresponds to a firing angle of 90°.

A differentiating element 31 which, on its input side, receives a signal that is proportional to the intermediate circuit DC voltage $U_d$ from a potentiometer 37, is connected on its output side through a voltage rise comparator 32 with a second input of the OR gate 30. The voltage rise comparator 32 supplies on its output side a signal $S_{32}$ that is "1" if the voltage rise dU/dt is greater than a predetermined limiting value G within the range of 3 kV/ms to 100 kV/ms; the limiting value G is preferably 50 kV/ms. If the voltage rise is less than G, $S_{32}=$"0". By means of this voltage rise comparator 32, line defects in the DC line 10 may be detected and evaluated.

A DC voltage comparator 33 which, on its input side, receives the signal proportional to the intermediate circuit DC voltage $U_d$ from potentiometer 37, is connected with its output inverted through a time-lag element 34 that has a predetermined time-lag of 300 ms with a first input of an AND gate 35 and through a direct link with a second input of said AND gate 35. An output signal $S_{33}$ may also be obtained from the output of comparator 33. On its output side, the AND gate 35 is connected with a third input of the OR gate 30. $S_{33}$ is "1" if the intermediate circuit DC voltage $U_d$ is lower than a predetermined intermediate circuit limiting voltage $U_{dG}$ that is within the range of 10% to 30%, preferably 25%, of the intermediate circuit nominal voltage that is approximately 60 kV. The output signal of the AND gate 35 is a "1" only if $U_d$ is less than $U_{dG}$ for at least 300 ms.

Further, a fourth input of the OR gate 30 receives the protection actuating signal S' of the other static converter group, i.e. the static converter group 11.

The shorting device 9 in the HVDC transmission station of the static converter group 5 will thus be closed if:

the AC voltage $U_2$ is larger than the predetermined AC limiting value $U_{2G}$ for at least 100 ms;
the rise of the intermediate circuit DC voltage, $dU_d/dt$, is larger than the predetermined limiting value, G;
the intermediate circuit DC voltage, $U_d$, is less than the predetermined intermediate circuit limiting voltage $U_{dG}$ for at least 300 ms; or
the protection actuating signal S' of the other static converter group 11 is equal to "1".

The control apparatus 15', not shown in FIG. 2, receives on its input side, in place of the AC voltage signal $S_u$, the voltage signal $S'_u$ of the HVDC station of the power converter group 11 which is proportional to AC voltage $U_{12}$; and, instead of the DC actual value signal $i_d$, the control apparatus 15' receives the DC actual value signal $i'_d$ supplied by a current transformer 36' on the inverter side; and, in place of the intermediate circuit voltage $U_d$ at the location of the power converter group 5, the control apparatus 15' receives the signal at the location of the converter group 11; and instead of the protection actuating signal S', the control apparatus 15' receives the protection actuating signal S of the converter group 5.

It should be understood that the switches 18, 20 and 23 are electronic switches. Instead of the P-I regulators 17 and 24, PID controllers with proportional-integral-differential characteristics may be used. The reference values of the summers 16, 22, and the comparators 25, 27 and 33 may be set by means of for example potentiometers. In place of the transformers 36 and 36' in the DC intermediate circuit, the ammeters 13 and 13' may be used on the AC side of the static converters 5 and 11, as shown in FIG. 1. The important fact is that the outputs of the ammeters 13 and 13' be proportional to the DC values $i_d$ and $i'_d$ in the DC intermediate circuit.

Instead of using the control apparatus 15 or 15' to observe the AC voltage $U_2$ or $U_{12}$ for an excess over a limiting value $U_{2G}$ or $U_{12G}$, as described above, in keeping with the present invention the AC voltage of the other HVDC station may be monitored with respect to whether, for at least 100 ms, 50% of the nominal voltage is not attained. In this embodiment, therefore, the control apparatus 15 observes whether the AC voltage $U_{12}$ is less than half of 345 kV.

In the case of a HVDC short-distance coupling with only a single shorting device 9 or 9a, the control apparatus 15 may receive, instead of the protection actuating signal S', the protection actuating signal S; and the control apparatus 15' may receive the protection actuating signal S'.

It will be appreciated by those of ordinary skill in the art that the present invention can be embodied in other specific forms without departing from the spirit or the essential characteristics thereof. The presently disclosed embodiments are therefore considered in all respects to be illustrative and not restrictive. The scope of the invention is illustrated by the appended claims rather than the foregoing description and all changes that come within the meaning and range of equivalents thereof are intended to be embraced therein.

We claim:

1. In an AC power transmission network of the type including a pair of static converters with adjustable firing angles and having a DC intermediate circuit between them, and at least one normally deactuated shorting device included within said intermediate circuit, a process for reducing dynamic overvoltages in the AC power transmission network comprising the steps of:
   detecting a disturbance of the type in which one of said static converters cannot be adequately controlled;
   initially setting the other static converter to operate at a predetermined firing angle;
   generating a shorting signal to actuate said shorting device to short circuit the static converter which cannot be adequately controlled; and
   regulating the firing angle of said other static converter in accordance with the AC voltage that is applied to said other converter so as to reduce any overvoltage in said network.

2. Process according to claim 1, wherein said shorting signal is passed to said shorting device when the AC voltage of the AC network connected with said other converter amounts to more than 120% of the nominal voltage of the AC network for at least 100 ms.

3. Process according to claim 1, wherein said shorting signal for short circuiting said uncontrollable converter is produced simultaneously with a control signal for adjusting of the firing angle.

4. Process according to claim 3, wherein a shorting signal is produced when a voltage carried by the DC intermediate circuit declines for at least 300 ms to a voltage less than 30% of an intermediate circuit nominal voltage.

5. Process according to claim 4, wherein a shorting signal is produced when a protection actuating signal of a converter is generated.

6. Process according to claim 5, wherein said static converters are each equipped with a shorting device, and wherein the shorting signal for the shorting device in each static converter is produced in response to the protection actuating signal of the other converter.

7. Process according to claim 6, characterized in that each shorting signal is produced when the rate of change of the DC intermediate circuit voltage is greater than 50 kV/ms.

8. Process according to claim 7, characterized in that the control signal for adjusting the firing angle of a converter, in the absence of a shorting signal is formed by current regulation in response to a current in the DC intermediate circuit, and, in the presence of a shorting signal, by voltage regulation in response to the AC voltage applied to the other converter.

9. Process according to claim 8, characterized in that a voltage regulator to control the voltage for the formation of the control signal for adjusting the firing angle of the converter is exposed to zero potential when the current in the DC intermediate circuit is greater than a predetermined maximum value.

10. Process according to claim 9, characterized in that the firing angle for the other converter is set at 90° for 50 ms in response to the onset of a shorting signal.

* * * * *